(12) United States Patent
Kondo et al.

(10) Patent No.: US 10,348,349 B2
(45) Date of Patent: Jul. 9, 2019

(54) ELECTRONIC APPARATUS AND MANUFACTURING METHOD OF ELECTRONIC APPARATUS

(71) Applicants: Kabushiki Kaisha Toshiba, Minato-ku (JP); Toshiba Infrastructure Systems & Solutions Corporation, Kawasaki-shi (JP)

(72) Inventors: Takahiro Kondo, Hachioji (JP); Masaki Nakamoto, Suginami (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/554,262

(22) PCT Filed: Dec. 24, 2015

(86) PCT No.: PCT/JP2015/085978
§ 371 (c)(1),
(2) Date: Aug. 29, 2017

(87) PCT Pub. No.: WO2016/181582
PCT Pub. Date: Nov. 17, 2016

(65) Prior Publication Data
US 2018/0062683 A1    Mar. 1, 2018

(30) Foreign Application Priority Data

May 14, 2015  (JP) .................................. 2015-099384

(51) Int. Cl.
*H01Q 1/24* (2006.01)
*H04B 1/3827* (2015.01)
(Continued)

(52) U.S. Cl.
CPC ......... *H04B 1/3833* (2013.01); *H01Q 1/1235* (2013.01); *H01Q 1/243* (2013.01); *H04B 2001/3894* (2013.01)

(58) Field of Classification Search
CPC .......... H01Q 1/125; H01Q 1/08; H01Q 1/084; H01Q 1/1235; H01Q 15/161; H01Q 1/12;
(Continued)

(56) References Cited

U.S. PATENT DOCUMENTS 5,432,524 A * 7/1995 Sydor ................... H01Q 1/3275
343/765
8,169,375 B1 * 5/2012 Conrad .................... H01Q 1/08
343/711
(Continued)

FOREIGN PATENT DOCUMENTS

JP  2005-331032 A  12/2005
JP  2006-19344 A   1/2006
JP  2007-292280 A  11/2007

OTHER PUBLICATIONS

International Search Report dated Apr. 5, 2016 in PCT/JP2015/065978 (with English translation).

*Primary Examiner* — Linh V Nguyen
(74) *Attorney, Agent, or Firm* — Oblon, McClelland, Maier & Neustadt, L.L.P.

(57) ABSTRACT

An electronic apparatus of an embodiment includes a movable housing, a main housing, a joint, a cable, and a seal structure. The joint includes a connection portion connected to the movable housing, and a fixed portion connected to the main housing. The cable extends from an inside of the movable housing to an inside of the main housing through an inside of the connection portion and an inside of the fixed portion. The seal structure seals between the movable hous-
(Continued)

ing and the connection portion, and seals between the main housing and the fixed portions.

12 Claims, 9 Drawing Sheets

(51) Int. Cl.
*H01Q 1/12* (2006.01)
*H04B 1/38* (2015.01)

(58) Field of Classification Search
CPC .......... H01Q 1/288; H01Q 3/02; H01Q 15/20; H01Q 1/243; H01Q 1/32; H01Q 1/10; H01R 13/5213; H01R 13/6691; H01R 13/447; H01R 13/5219; H01R 13/6315; H01R 2201/06; H01R 13/516; H01R 13/5202; H01R 13/60; H01R 13/631; H01R 13/64; H01R 13/66
USPC .......... 343/702, 880, 881, 882, 915
See application file for complete search history.

(56) References Cited

U.S. PATENT DOCUMENTS

| | | | |
|---|---|---|---|
| 8,743,008 B2 * | 6/2014 | Kim | H01Q 1/246 343/757 |
| 10,135,127 B2 * | 11/2018 | Newkirk | H04B 7/18515 |
| 10,218,047 B2 * | 2/2019 | Nakamoto | H01Q 1/1264 |
| 2004/0027307 A1 * | 2/2004 | Hossein | H01Q 1/1242 343/890 |
| 2007/0227873 A1 * | 10/2007 | Kawasaki | G06F 1/1613 200/443 |
| 2010/0009728 A1 * | 1/2010 | Koshi | H01Q 1/243 455/575.3 |
| 2010/0045541 A1 * | 2/2010 | Aoki | H01Q 1/243 343/702 |
| 2014/0266943 A1 * | 9/2014 | Thomson | H01Q 3/08 343/765 |
| 2014/0299734 A1 * | 10/2014 | Nielsen | H01Q 1/005 248/560 |
| 2015/0271950 A1 * | 9/2015 | Hagiwara | H05K 7/206 361/696 |
| 2016/0156107 A1 * | 6/2016 | Lee | H01Q 15/162 343/840 |

* cited by examiner

ELECTRONIC APPARATUS AND MANUFACTURING METHOD OF ELECTRONIC APPARATUS

TECHNICAL FIELD

Embodiments of the invention relate to an electronic apparatus and a manufacturing method of an electronic apparatus.

BACKGROUND ART

A foldable mobile phone having a waterproof hinge structure is known. In this mobile phone, a flexible printed circuit board is inserted into a hinge which connects two housings.

In a case where an electric connection member is inserted into the hinge which connects a plurality of housings, the structure of the hinge tends to be complicated. For this reason, the waterproofness of the circumference of the hinge tends to be weak compared with other portions.

PRIOR ART LITERATURE

Patent Literature

Patent Document 1: Japanese Unexamined Patent Application Publication No. 2006-19344

SUMMARY OF INVENTION

Issue to be Solved by Invention

A technical problem is to provide an electronic apparatus and a manufacturing method of an electronic apparatus which improve waterproofness.

An electronic apparatus of an embodiment includes a movable housing, a main housing, a joint, a cable, and a seal structure. The movable housing has a first opening and accommodates at least an antenna element. The main housing has a second opening. The joint includes a connection portion and a fixed portion. The connection portion is connected to the movable housing. The connection portion communicates with an inside of the movable housing through the first opening. The fixed portion is connected to the main housing. The fixed portion communicates with an inside of the main housing through the second opening. The joint rotatably connects the movable housing and the main housing. The cable is electrically connected to the antenna element. The cable extends from the inside of the movable housing to the inside of the main housing through an inside of the connection portion and an inside of the fixed portion. The seal structure seals between the movable housing and the connection portion, and seals between the main housing and the fixed portion.

MODE FOR CARRYING OUT INVENTION

Figure 1:
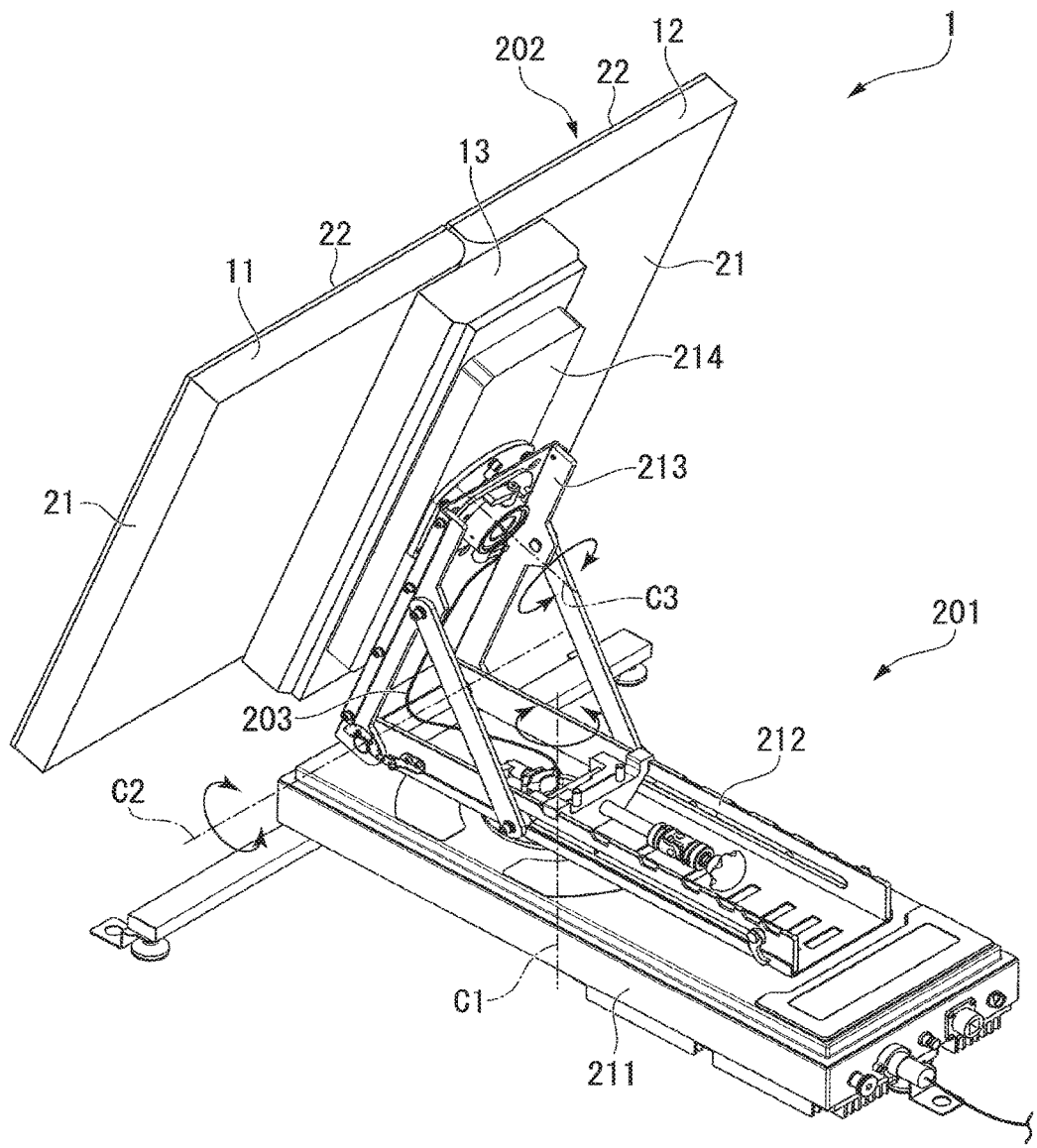
FIG. 1 is a perspective view showing the whole electronic apparatus of an embodiment.

Hereinafter, an electronic apparatus of an embodiment will be described with reference to the accompanying drawings. In the following description, configurations having substantially the same or similar functions are designated by the same reference numerals. Overlapping descriptions thereof may be omitted.

An electronic apparatus 1 of an embodiment will be described with reference to FIGS. 1 to 8.

First, the whole structure of the electronic apparatus 1 will be described.

FIG. 1 shows an example of the whole structure of the electronic apparatus 1.

As shown in FIG. 1, the electronic apparatus 1 of this embodiment is a flat antenna device. The electronic apparatus 1 includes antenna elements described later. The electronic apparatus 1 receives an electric wave from a communication satellite and transmits an electric wave toward the communication satellite. For example, the electronic apparatus 1 is a device which constitutes a part of Very Small Aperture Terminal (VSAT) systems.

The electronic apparatus 1 of this embodiment is a foldable flat antenna device designed to be portable by hand. The electronic apparatus 1 can be carried and stored in a folded state. The electronic apparatus 1 can communicate with the communication satellite in an expanded state.

More specifically, as shown in FIG. 1, the electronic apparatus 1 includes an antenna support structure 201 and an antenna unit 202.

The Antenna support structure 201 includes a first supporter 211, a second supporter 212, a third supporter 213, and a fourth supporter 214.

The first supporter 211 is placed on an installation surface of an installation place. The first supporter 211 is formed in a flat box shape.

The second supporter 212 is rotatably connected to the first supporter 211. The second supporter 212 is rotatable with respect to the first supporter 211 about a first axis line C1 that extends in the thickness direction of the first supporter 211.

The third supporter 213 is disposed substantially parallel to the antenna unit 202. The third supporter 213 is formed in a flat shape. The third supporter 213 is rotatably connected to an end portion of the second supporter 212. The third supporter 213 is rotatable with respect to the second supporter 212 about an axis line C2 that is substantially parallel to a main surface of the first supporter 211.

The fourth supporter 214 is attached to the antenna unit 202. The fourth supporter 214 is rotatably connected to the third supporter 213. The fourth supporter 214 is rotatable with respect to the third supporter 213 about a third axis line C3 that extends in the thickness direction of the third supporter 213.

According to such antenna support structure 201, the antenna unit 202 can change posture between a closed position in which the antenna unit 202 overlaps with the first supporter 211 and a raised position in which the antenna unit 202 has been raised from the first supporter 211. Furthermore, the direction of the antenna unit 202 can be changed toward a desired direction with respect to the first supporter 211.

Next, the antenna unit 202 will be described.

Figure 2:
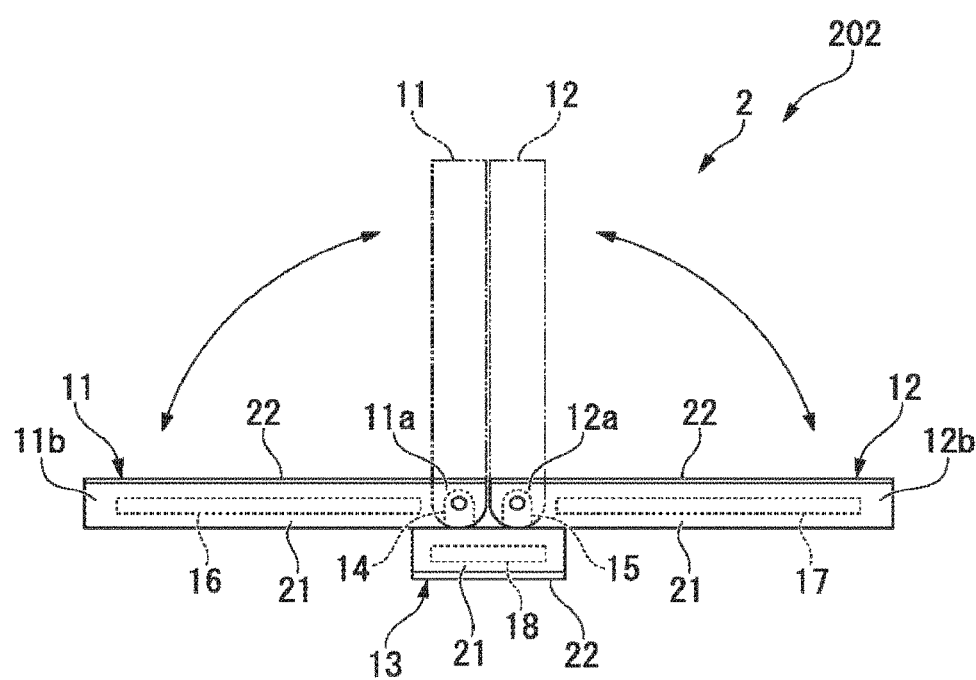
FIG. 2 is a side view typically showing an antenna unit shown in FIG. 1.

FIG. 2 typically shows a structure of the antenna unit 202.

As shown in FIG. 2, the antenna unit 202 has a foldable housing structure 2 which includes three housings.

Figure 3:
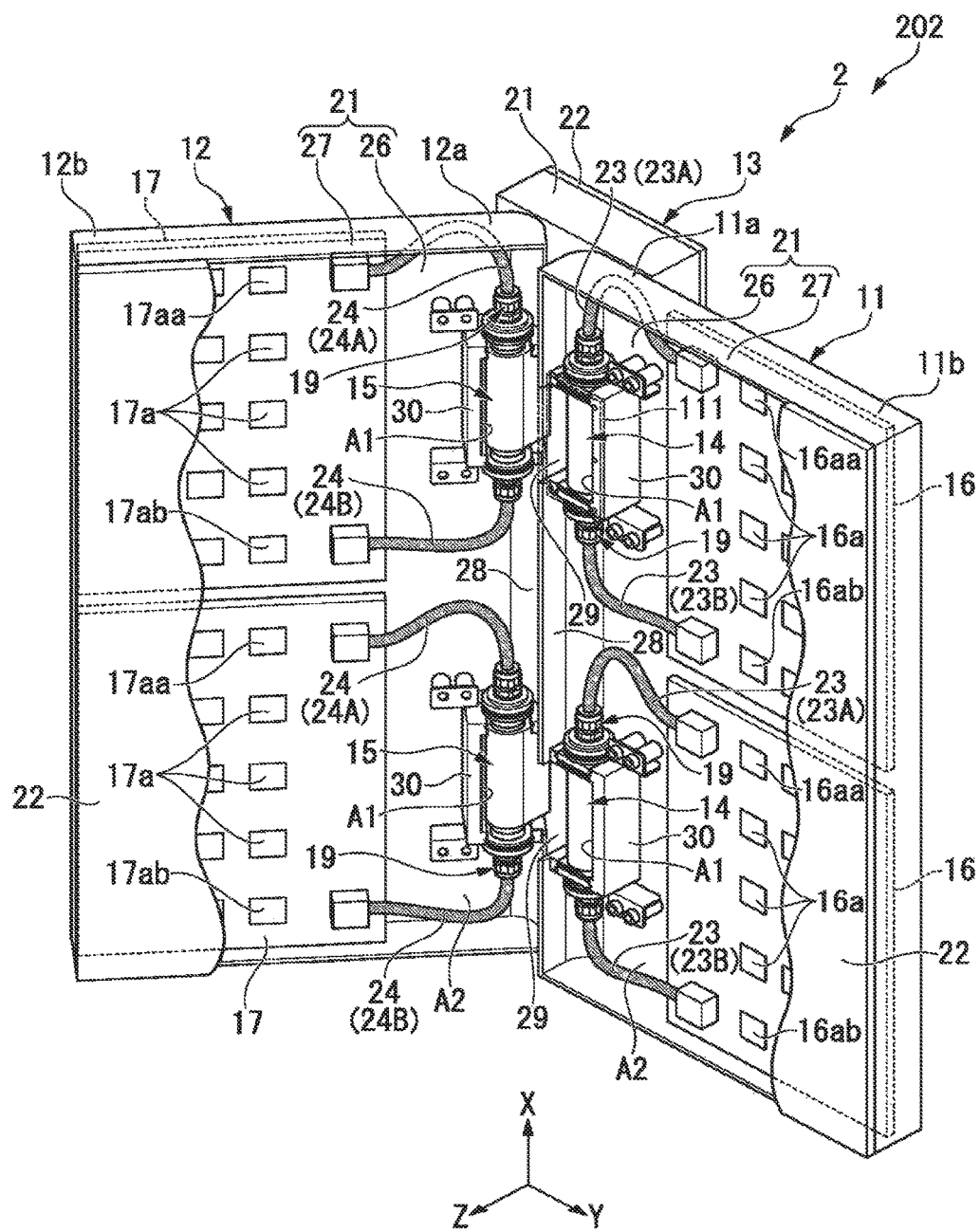
FIG. 3 is a perspective view showing the inside of the antenna unit shown in FIG. 1.

More specifically, the housing structure 2 includes a first movable housing 11, a second movable housing 12, a main housing 13, first hinges 14, second hinges 15, and seal structures 19 (refer to FIG. 3). Each of the first movable housing 11 and the second movable housing 12 is an example of a "movable housing." Each of the first hinge 14 and the second hinge 15 is an example of a "joint." The seal structure 19 includes movable housing-seal parts 53, cable-seal parts 57, and a main housing-seal part 66, which are described later.

The first movable housing 11 is formed in a flat box shape. The first movable housing 11 has a first end 11a and a second end 11b. The first end 11a faces the main housing 13. The first hinges 14 are provided between the first end 11a of the first movable housing 11 and the main housing 13. The first hinge 14 rotatably connects the first end 11a of the first movable housing 11 and the main housing 13.

The second movable housing 12 has substantially the same shape as the first movable housing 11. That is, the second movable housing 12 is formed in a flat box shape. The second movable housing 12 has a first end 12a and a second end 12b. The first end 12a faces the main housing 13. The second hinges 15 are provided between the first end 12a of the second movable housing 12 and the main housing 13. The second hinge 15 rotatably connects the first end 12a of the second movable housing 12 and the main housing 13.

The first movable housing 11 and the second movable housing 12 are openable and closable by the first hinges 14 and the second hinges 15 between an opened state in which the first movable housing 11 and the second movable housing 12 are opened each other (refer to the solid line in FIG. 2), and a closed state in which the first movable housing 11 and the second movable housing 12 face each other (refer to the two-dot chain line in FIG. 2). In the opened state, the first movable housing 11 and the second movable housing 12 are opened each other substantially 180 degrees. On the other hand, in the closed state, the first movable housing 11 and the second movable housing 12 are folded so that the first movable housing 11 and the second movable housing 12 overlap with each other.

The main housing 13 is formed in a flat box shape. However, the main housing 13 is smaller than the first movable housing 11 and the second movable housing 12. For example, the main housing 13 is disposed so that the main housing 13 is substantially parallel to the first movable housing 11 and the second movable housing 12 which are in the opened state.

FIG. 3 shows the inside of the antenna unit 202.

As shown in FIG. 3, the first movable housing 11 accommodates a plurality of (for example, two) first antenna board 16 as examples of a first antenna component. Each of the first antenna boards 16 includes a plurality of antenna elements 16a. The antenna element 16a is a conductive pattern provided on a surface of the first antenna board 16, for example. The plurality of antenna elements 16a includes a plurality of first antenna elements 16aa and a plurality of second antenna elements 16ab. It should be noted that the first antenna element 16aa and the second antenna element 16ab are distinguished from each other for convenience of explanation, and the structure and functions thereof may be the same as each other. For example, the first antenna element 16aa and the second antenna element 16ab may be provided separately on separate antenna boards 16. The first antenna board 16 is an example of a "first electronic component."

Similarly, the second movable housing 12 accommodates a plurality of (for example, two) second antenna boards 17 as examples of a second antenna component. Each of the second antenna boards 17 includes a plurality of antenna elements 17a. The antenna element 17a is a conductor pattern provided on a surface of the second antenna board 17, for example. The plurality of antenna elements 17a includes a plurality of first antenna elements 17aa and a plurality of second antenna elements 17ab. It should be noted that the first antenna element 17aa and the second antenna element 17ab are distinguished from each other for convenience of explanation, and the structure and functions thereof may be the same as each other. For example, the first antenna element 17aa and the second antenna element 17ab may be provided separately on separate antenna boards 17. The second antenna board 17 is an example of a "second electronic component". For example, the first antenna board 16 and the second antenna board 17 are components that form a reflecting mirror of a planar antenna.

On the other hand, the main body housing 13 accommodates a control board 18 (refer to FIG. 2) as an example of a circuit board. The control board 18 is a circuit board including, for example, a Central Processing Unit (CPU). The control board 18 includes an antenna circuit unit for controlling the first antenna board 16 and the second antenna board 17.

Next, each part of the housing structure 2 will be described in detail.

As shown in FIG. 3, the first movable housing 11 includes a base 21 formed in a bowl shape, and a cover 22 attached to the base 21. Similarly, the second movable housing 12 includes a base 21 formed in a bowl shape, and the cover 22 attached to the base 21. Each cover 22 forms a radome with respect to the first antenna board 16 or the second antenna board 17. A seal member that is not shown seals liquid-tightly between the cover 22 and the base 21. Similarly, the main housing 13 includes a base 21 formed in a bowl shape, and a cover 22 attached to the base 21. A seal member that is not shown seals liquid-tightly between the base 21 and the cover 22 of the main housing 13.

As shown in FIG. 3, the antenna unit 202 includes a plurality of cables 23 extending to the inside of the first movable housing 11, and a plurality of cables 24 extending to the inside of the second movable housing 12. Each of the cable 23 and the cable 24 is a relatively large diameter cable with a round cross section.

Figure 4:
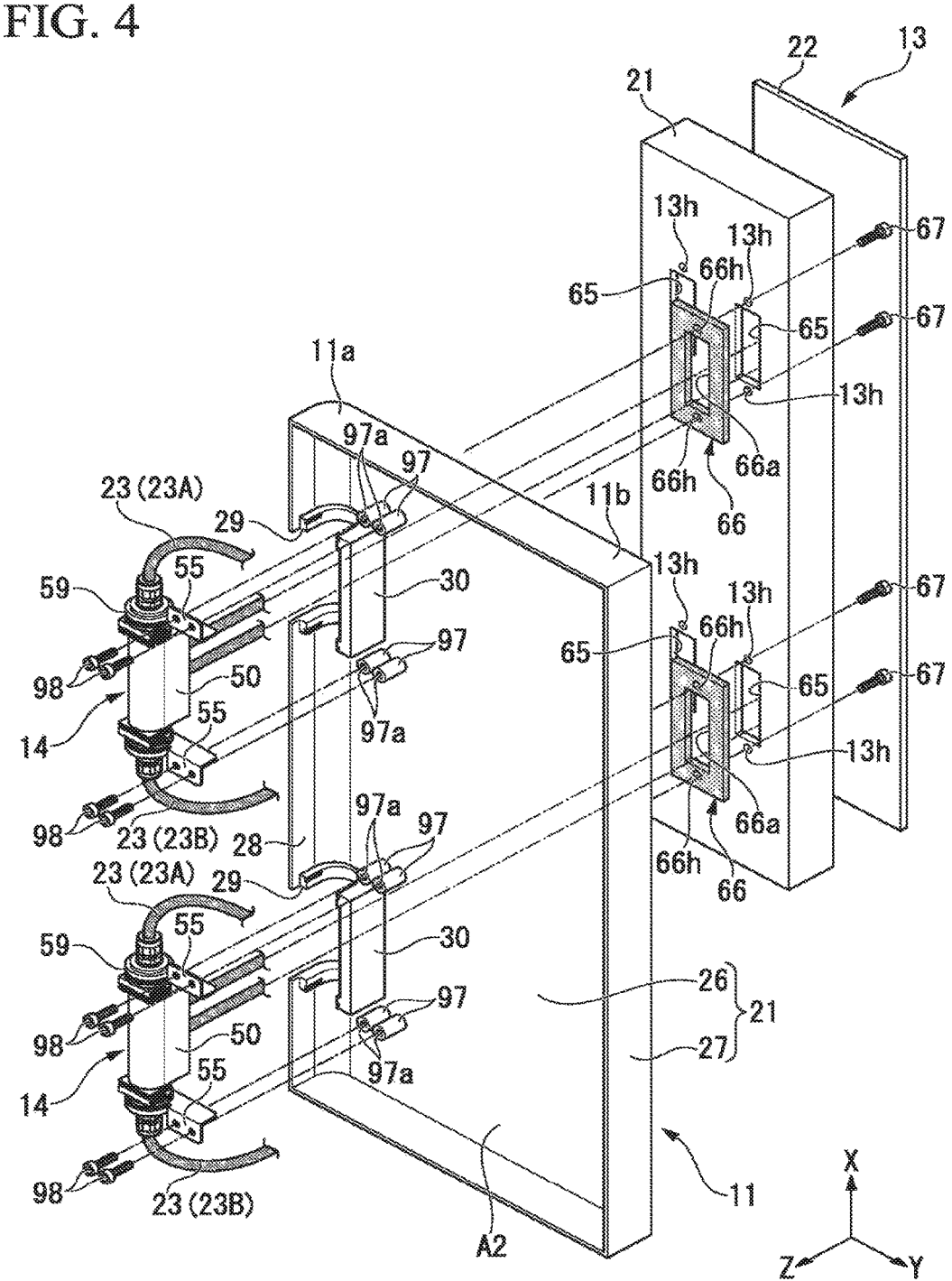
FIG. 4 is a partially exploded perspective view showing the antenna unit shown in FIG. 3.

FIG. 4 is a partially exploded perspective view showing the antenna unit 202.

As shown in FIG. 4 the cable 23 extends from the inside of the first movable housing 11 to the inside of the main housing 13 through the inside of the first hinge 14. The cable 23 electrically connects the first antenna board 16 and the control board 18. That is, the cable 23 electrically connects the antenna elements 16a and the control board 18. Although not shown, similarly, the cable 24 extends from the inside of the second movable housing 12 to the inside of the main housing 13 through the inside of the second hinge 15. The cable 24 electrically connects the second antenna board 17 and the control board 18. That is, the cable 24 electrically connects the antenna elements 17a and the control board 18.

The cable 203 (refer to FIG. 1) is connected to the control board 18. The cable 203 extends toward an external device (for example, information processing device) or the like, which is arranged outside the electronic apparatus 1. The control board 18 outputs information received by the antenna unit 202 to the external device through the cable 203. The control board 18 carries out radio transmission of information which the control board 18 receives from the external device through the cable 203 outside via the antenna unit 202.

Next, a connection structure of the first movable housing 11 and the main housing 13, and a connection structure of the second movable housing 12 and the main housing 13 will be described.

Here, the electronic apparatus 1 of this embodiment includes two first hinges 14 and two second hinges 15. The configurations of these four hinges are substantially the same as one another. In addition, the configurations of the first movable housing 11 and the second movable housing 12 are substantially the same as each other. Therefore, hereinafter, the structure of one first hinge 14 and the first movable housing 11 to which the first hinge 14 is attached will be described in detail. Regarding the structure of the second hinge 15 and the second hinge 15 to which the second hinge 15 is attached, "first hinge 14", "first movable housing 11", "cable 23", "cable 23A", "cable 23B", "first antenna element 16aa", and "second antenna element 16ab" in the following description may be replaced with "second hinge 15", "second movable housing 12", "cable 24", "cable 24A", "cable 24B", "first antenna element 17aa", and "second antenna element 17ab", respectively.

In addition, X direction, Y direction, and Z direction are defined here. The X direction and the Y direction are substantially parallel to a bottom wall 26 of the first movable housing 11, which is described later. The X direction is substantially parallel to a side wall part 28 of the first movable housing 11, which is described later. The Y direction is a direction which is crossing with (for example, substantially perpendicularly to) the side wall part 28. The Z direction is crossing with (for example, substantially perpendicularly to) the bottom wall 26. The Z direction is the thickness direction of the first movable housing 11.

Figure 5:
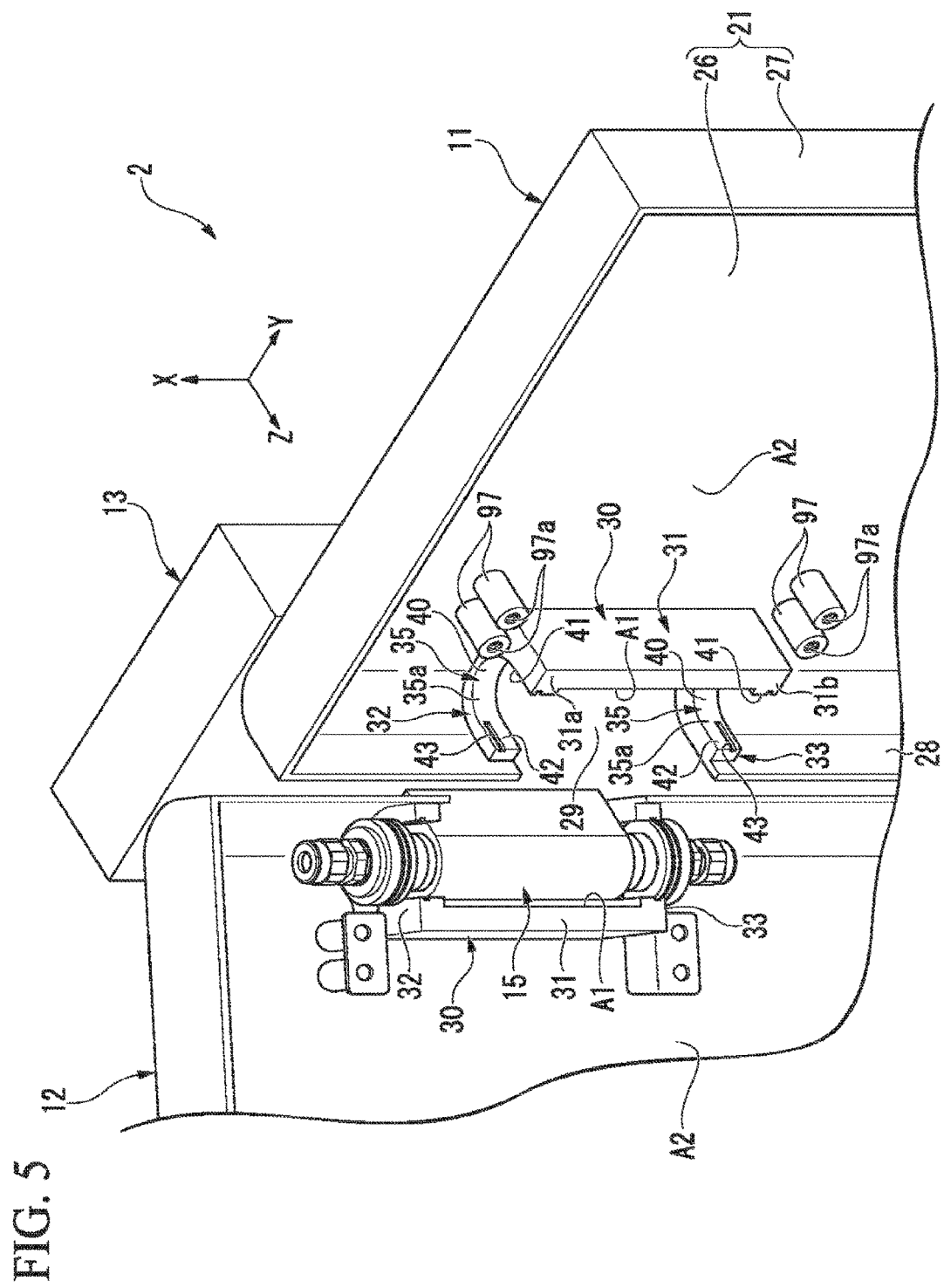
FIG. 5 is an expanded perspective view showing the inside of the first movable housing shown in FIG. 3.

FIG. 5 is an expanded perspective view showing the inside of the first movable housing.

As shown in FIG. 5, the first movable housing 11 includes the bottom wall 26 and a peripheral wall 27. The bottom wall 26 is a wall which faces the cover 22. The bottom wall 26 faces the main housing 1 in the above-mentioned opened state. The peripheral wall 27 extends in the direction which crosses with the bottom wall 26 from the edge of the bottom wall 26. The peripheral wall 27 includes the side wall part 28 that extends along the second movable housing 12. The side wall part 28 faces the main housing 13 in the above-mentioned closed state.

As shown in FIG. 5, the first movable housing 11 has holes 29. The hole 29 opens to the outside of the first movable housing 11. The hole 29 is provided over the bottom wall 26 and the side wall part 28. That is, the hole 29 has a part provided in the bottom wall 26, and a part provided the side wall part 28.

The partition 30 is provided inside the first movable housing 11. The partition 30 divides the inside of the first movable housing 11 into a first region A1 and a second region A2. The hole 29 communicates with the first region A1. The second region A2 is separated from the hole 29.

That is, the inside of the first movable housing 11 is divided by the partition 30 into the first region A1 which allows water from the outside to enter the first region A1, and the second region A2 which has waterproofness. The first antenna board 16 is disposed in the second region A2. Similarly, the second antenna board 17 is disposed in the second region A2 of the second movable housing 12. Thereby, the first antenna board 16 and the second antenna board 17 are protected from external water or the like.

More specifically, the partition 30 includes a first wall 31, a second wall 32, and a third wall 33. The first wall 31, the second wall 32, and the third wall 33 extend in the Z direction from the bottom wall 26.

As shown in FIG. 5, the first wall 31 extends in the X direction at positions away from the side wall part 28. The width of the first wall 31 in the X direction is greater than the width of the hole 29 in the X direction. The first wall 31 has a first end 31a and a second end 31b which are both ends in the X direction.

The second wall 32 is provided between the first end 31a of the first wall 31, and the side wall part 28. The second wall 32 extends in the Y direction. The second wall 32 connects the first end 31a of the first wall 31, and the side wall part 28. The second wall 32 has an insertion part 35 through which a below-mentioned first cylinder 51 of the first hinge 14 passes. The insertion part 35 in the second wall 32 is an example of a "first opening." The insertion part 35 passes through the second wall 32 in the X direction. The insertion part 35 is a cut-out which opens in the Z direction. Alternatively, the insertion part 35 may be a through hole provided in the second wall 32.

As shown in FIG. 5, an example of the insertion part 35 is formed in a U-shaped form. That is, an inner surface 35a of the insertion part 35 has a circular arc part 40, a first straight part 41, and a second straight part 42. The circular arc part 40 has an arc shape in which its width increases as it goes in the Z direction. The first straight part 41 extends in the Z direction from an end of the circular arc part 40. The second straight part 42 extends in the Z direction from the other end of the circular arc part 40. The second straight part 42 is substantially parallel to the first straight part 41. The width in the Y direction between the first straight part 41 and the second straight part 42 is greater than the width in the Y direction of the first cylinder 51 which is described later. A guide slot 43 is provided in each of the first straight part 41 and the second straight part 42. The guide slot 43 extends in the Z direction.

The third wall 33 is provided between the second end 31b of the first wall 31, and the side wall part 28. The third wall 33 extends in the Y direction. The third wall 33 connects the second end 31b of the first wall 31, and the side wall parts 28. The third wall 33 has an insertion part 35 through which a below-mentioned second cylinder 52 of the first hinge 14 passes. The insertion part 35 in the third wall 33 is an example of a "third opening." The insertion part 35 passes through the third wall 33 in the X direction. The insertion part 35 is a cut-out which opens in the Z direction. Alternatively, the insertion part 35 may be a through hole provided in the third wall 33. The shape of the insertion part 35 in the third wall 33 is substantially the same as the shape of the insertion part 35 in the second wall 32. Therefore, configurations having similar functions are designated by the same reference numerals. Overlapping descriptions thereof may be omitted.

Next, the first hinge 14 will be described in detail.

Figure 6:
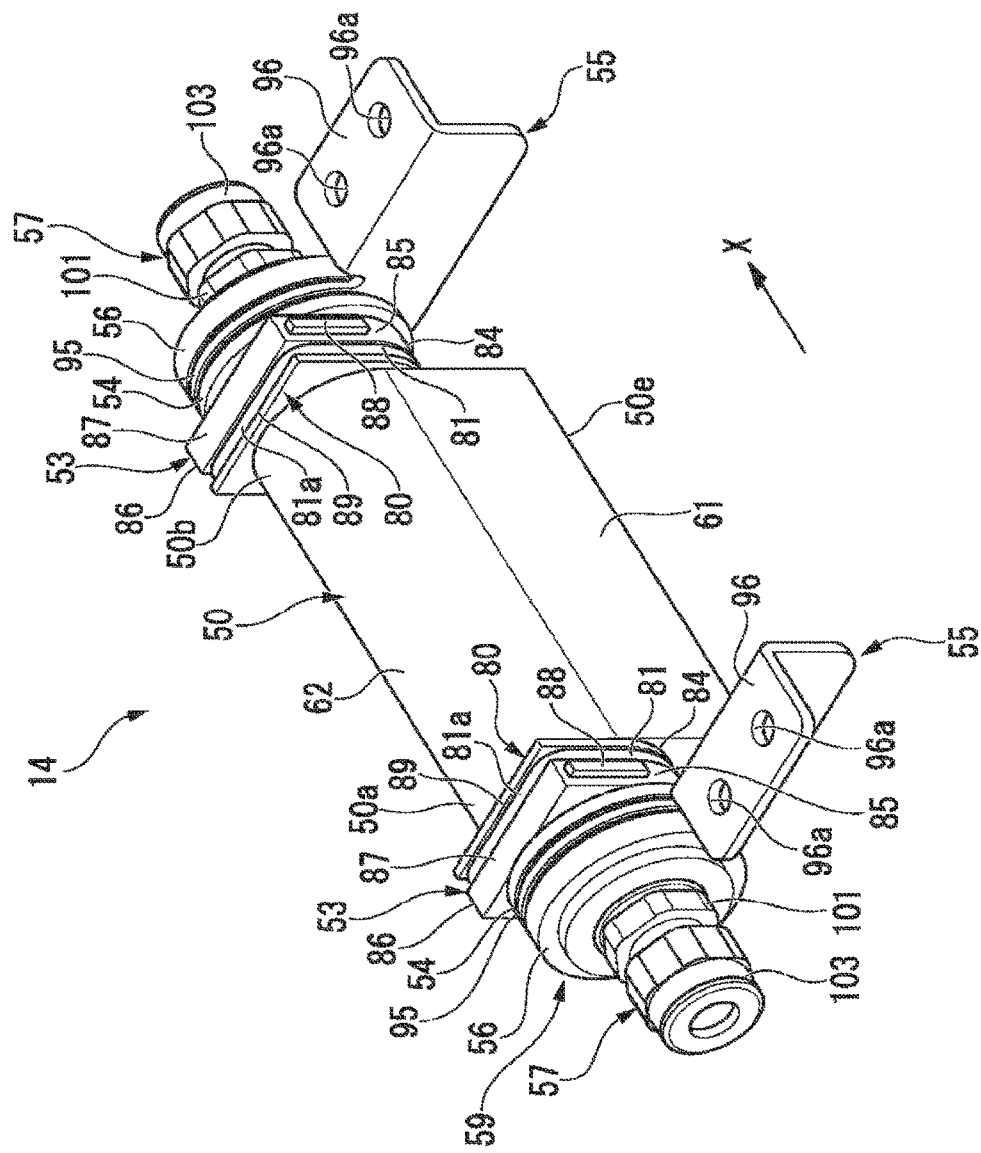
FIG. 6 is a perspective view showing a first hinge shown in FIG. 3.

FIG. 6 shows an appearance of the first hinge 14.

As shown in FIG. 6, the first hinge 14 includes a fixed portion 50 and a connection portion 59. The fixed portion 50 is connected to the main housing 13. The connection portion 59 is connected to the first movable housing 11. The connection portion 59 is a portion of the first hinge 14, which passes through the insertion part 35 of the first movable housing 11. The connection portion 59 of this embodiment includes a first cylinder 51, the second cylinder 52, a plurality of washers 54, and a plurality of attachments 55, and a plurality of brake parts 56. In this embodiment, the structure in which the movable housing-seal parts 53 and the cable-seal parts 57 of the seal structure 19 are provide integrally with the first hinge 14 is described as an example. Alternatively, the movable housing-seal part 53 and the cable-seal part 57 may be formed separately from the first hinge 14. The movable housing-seal part 53 and the cable-seal part 57 may be provided in the first movable housing 11 after the first hinge 14 is attached to the first movable housing 11.

Next, the connection structure of the first hinge 14 and the main housing 13.

The fixed portion 50 includes, as shown in FIG. 6, a rectangle-like first portion (base) 61, and a semicircle-like second portion (cover) 62. The fixed portion 50 is formed in a hollow shape. The first portion 61 has the shape of a rectangle which has a longitudinal direction in the X direction. The second portion 62 is formed integrally with the first portion 61. The second portion 62 is formed in the shape of a circular arc along the outer peripheral surfaces of the first cylinder 51 and the second cylinder 52.

Figure 7:
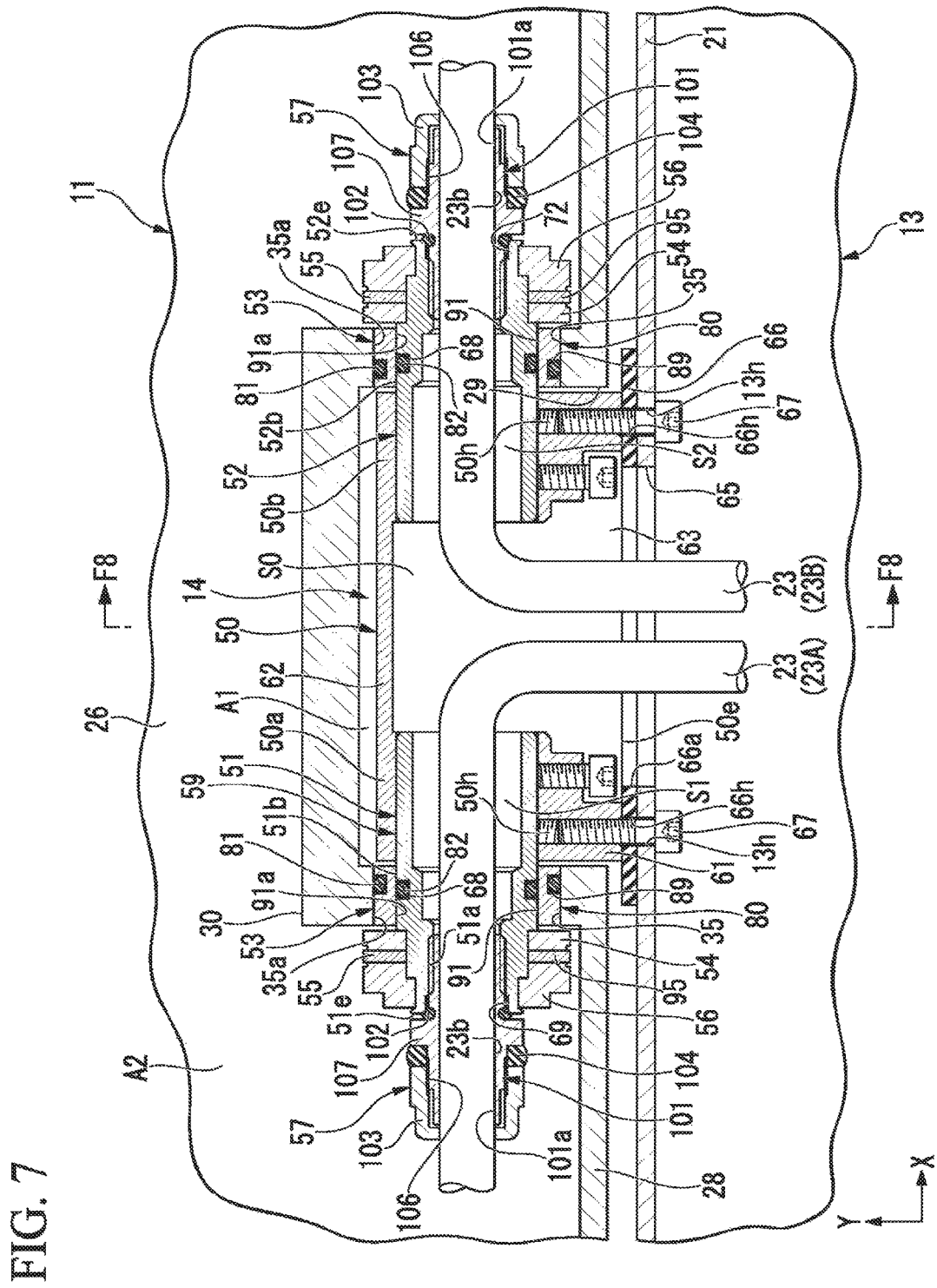
FIG. 7 is a cross-section view showing a part of the antenna unit shown in FIG. 3.
Figure 8:
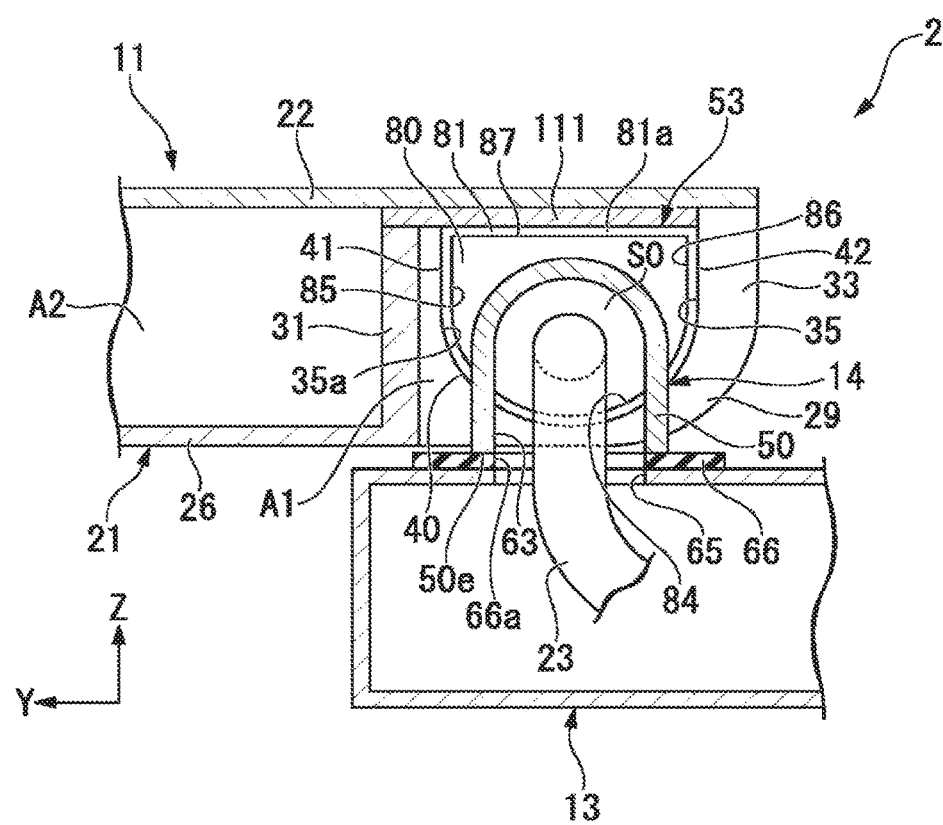
FIG. 8 is a cross-section view showing the antenna unit taken along F8-F8 line in FIG. 7.

FIG. 7 is a cross-section view showing a part of antenna unit 202. FIG. 8 is a cross-section view showing the antenna unit 202 taken along F8-F8 line in FIG. 7. Although the first movable housing 11 is in the above-mentioned closed state in FIG. 7, the first movable housing 11 is in the above-mentioned opened state in FIG. 8. In addition, in FIG. 8, illustrations of the first cylinder 51 and the second cylinder 52 are omitted for convenience of explanation.

As shown in FIGS. 7 and 8, the fixed portion 50 has an interior space S0. The fixed portion 50 has a fixed portion-end surface 50e located in the side opposite to the second portion 62. The fixed portion-end surface 50c has an opening 63 which opens to the outside of the fixed portion 50. The interior space S0 communicates with the outside of the fixed portion 50 through the opening 63. In addition, the fixed portion 50 has a first end 50a and a second end 50b which are both ends in the X direction.

Most part of the fixed portion 50 is disposed in the first region A1 of the first movable housing 11. A part of the fixed portion 50 passes through the hole 29 and protrudes to the outside of the first movable housing 11.

Here, as shown in FIG. 4, the main housing 13 has an opening 65 in a position corresponding to the fixed portion 50. The opening 65 is an example of a "second opening." The opening 65 is smaller than the outer shape of the fixed portion 50. The opening 65 faces the inside of the fixed portion 50.

As shown in FIGS. 7 and 8, the fixed portion 50 is connected to the main housing 13, and covers the opening 65. The interior space S0 of the fixed portion 50 communicates with the inside of the main housing 13 through the opening 65 of the main housing 13 (and an opening 66a of the main housing-seal part 66, which is described later).

As shown in FIGS. 4, 7, and 8, the main housing-seal part 66 is provided between the fixed portion-end surface 50e of the fixed portion 50 of the first hinge 14, and a surface of the main housing 13. The main housing-seal part 66 is a rubber packing, for example, sandwiched between the fixed portion-end surface 50e of the fixed portion 50 of the first hinge 14, and the surface of the main housing 13. The main housing-seal part 66 is formed in a board shape which is larger than the outer shapes of the openings 63 and 65, and surrounds the periphery of the openings 63 and 65. The main housing-seal part 66 liquid-tightly seals between the fixed portion 50 of the first hinge 14, and the main housing 13. The main housing-seal part 66 has an opening 66a. The outer shape of the opening 66a is substantially the same as that of the opening 50.

As shown in FIG. 7, the cable 23 extends from the inside of the first hinge 14 to the inside of the main housing 13 through the opening 63 of the fixed portion 50 of the first hinge 14, the opening 66a of the main housing-seal part 66, and the opening 65 of the main housing 13.

As shown in FIG. 7, the fixed portion 50 of the first hinge 14 has attachment holes 50h which are screw holes, for example. The attachment hole 50h opens in the fixed portion-end surface 50e. The main housing 13 has insertion holes 13h in the positions corresponding to the attachment holes 50h. The main housing-seal part 66 has insertion holes 66h in the positions corresponding to the attachment holes 50h. These insertion holes 1311 and 66h communicate with the attachment holes 50h.

The antenna unit 202 includes fastening members 67 which fix the fixed portion 50 of the first hinge 14 to the main housing 13. The fastening member 67 passes through the insertion holes 13h and 66h from the inside of the main housing 13, and is engaged with the attachment hole 50h. Thereby, the fixed portion 50 of the first hinge 14 is fixed to the main housing 13.

Next, a connection structure of the connection portion 59 of the first hinge 14 and the first movable housing 11 will be described. As shown in FIG. 7, the first cylinder 51, the second cylinder 52, the washers 54, the attachments 55, and the brake parts 56 included in the connection portion 59 are disposed over the first region A1 and the second region A2 of the first movable housing 11.

The first cylinder 51 is provided in the first end portion 50a of the fixed portion 50. The first cylinder 51 is a hollow component. The first cylinder 51 is connected to the fixed portion 50, and is fixed to the fixed portion 50. For example, an outer diameter of an outer peripheral surface 51b of the first cylinder 51 is slightly greater than an inner diameter of an inner surface of the first end 50a of the fixed portion 50. The first cylinder 51 is fitted in the first end 50a of the fixed portion 50. Thereby, a gap between the outer peripheral surface 51b of the first cylinder 51 and the inner surface of the fixed portion 50 is closed by fitting. Alternatively, the gap between the outer peripheral surface 51b of the first cylinder 51 and the inner surface of the fixed portion 50 may be liquid-tightly sealed by adhesive seal material which is not shown.

The first cylinder 51 protrudes from the fixed portion 50 along the X direction. The first cylinder 51 is metal, for example. The outer peripheral surface 51b of the first cylinder 51 has a groove 68. The groove 68 is annularly formed in the outer peripheral surface 51b of the first cylinder 51.

The first cylinder 51 has an interior space S1. The interior space S1 of the first cylinder 51 communicates with the interior space S0 of the fixed portion 50. The first cylinder 51 has the cylinder-end surface 51e located in the side opposite to the fixed portion 50. The cylinder-end surface 51e has an opening 69 which opens to the outside of the first cylinder 51. The interior space S1 communicates with the outside of the first cylinder 51 through the opening 69 of the cylinder-end surface 51e. In this embodiment, the first cylinder 51 is inserted into the insertion part 35 of the second wall 32 of the partition 30 of the first movable housing 11. Thereby, the interior space S1 of the first cylinder 51 communicates with the inside of the first movable housing 11 (for example, the second region A2 of the first movable housing 11) through the insertion part 35 of the partition 30.

In this application, the term "communicating with the inside of the housing through an opening" includes a case where the inside of the cylinder 51 communicates with the inside of the movable housing 11 by the cylinder 51 being inserted into the insertion part 35 (opening) of the first movable housing 11 like the above-mentioned relationship between the first cylinder 51 and the first movable housing 11.

As shown in FIG. 7, one cable 23 (it may call a cable 23A hereafter) extends from the interior space S0 of the fixed portion 50 to the interior space S1 of the first cylinder 51. The cable 23A extends from the opening 69 of the first cylinder 51 to the inside of the first movable housing 11 (that is, the second region A2 of the first movable housing 11). In other words, the cable 23A extends from the inside of the first movable housing 11 to the inside of the main housing 13 through the inside of the first cylinder 51 and the inside of the fixed portion 50. The cable 23A is an example of a "first cable." The cable 23A electrically connects the first antenna elements 16aa and the control board 18.

Similarly, as shown in FIG. 7, the second cylinder 52 is provided in the second end portion 50b of the fixed portion 50. The second cylinder 52 is a hollow component. The second cylinder 52 is connected to the fixed portion 50, and is fixed to the fixed portion 50. For example, an outer diameter of an outer peripheral surface 52b of the second cylinder 52 is slightly greater than an inner diameter of an inner surface of the second end 50b of the fixed portion 50. The second cylinder 52 is fitted in the second end 50b of the fixed portion 50. Thereby, a gap between the outer peripheral surface 52b of the second cylinder 52 and the inner surface of the fixed portion 50 is closed by fitting. The gap between the outer peripheral surface 52b of the second cylinder 52 and the inner surface of the fixed portion 50 may be liquid-tightly sealed by adhesive seal material which is not shown.

The second cylinder 52 protrudes from the fixed portion 50 along the X direction. The second cylinder 52 is formed of metal, for example. The outer peripheral surface 52b of the second cylinder 52 has a groove 68. The groove 68 is annularly formed in the outer peripheral surface 52b of the second cylinder 52.

The second cylinder 52 has an interior space S2. The interior space S2 of the second cylinder 52 communicates with the interior space S0 of the fixed portion 50. The second cylinder 52 has the cylinder-end surface 52e located in the side opposite to the fixed portion 50. The cylinder-end surface 52e has an opening 72 which opens to the outside of the second cylinder 52. The interior space S2 communicates with the outside of the second cylinder 52 through the opening 72 of the cylinder-end surface 52e. In this embodiment, the second cylinder 52 is inserted into the insertion part 35 of the third wall 33 of the partition 30 of the first movable housing 11. Thereby, the interior space S2 of the second cylinder 52 communicates with the inside of the first movable housing 11 (for example, the second region A2 of the first movable housing 11) through the insertion part 35 of the partition 30.

As shown in FIG. 7, another cable 23 (it may call a cable 23B hereafter) extends from the interior space S0 of the fixed portion 50 to the interior space S2 of the second cylinder 52. The cable 23B extends from the opening 72 of the second cylinder 52 to the inside of the first movable housing 11 (that is, the second region A2 of the first movable housing 11). In other words, the cable 23B extends from the inside of the first movable housing 11 to the inside of the main housing 13 through the inside of the second cylinder 52 and the inside of the fixed portion 50. The cable 23B is an example of a "second cable." The cable 23B electrically connects the second antenna elements 16ab and the control board 18.

Next, parts attached to the first cylinder 51 and the second cylinder 52 will be described. The first hinge 14 includes, as parts attached to the first cylinder 51 and the second cylinder 52, the movable housing-seal parts 53, the washers 54, the attachments 55, the brake parts 56, and the cable-seal parts 57. In addition, these parts are provided for each of the first cylinder 51 and the second cylinder 52. An attachment structure of these parts with respect to the first cylinder 51 and an attachment structure of these parts with respect to the second cylinder 52 are substantially the same except that they are symmetrical in the X direction. Therefore, the attachment structure of these parts with respect to the first cylinder 51 will be described as a representative example. Regarding the attachment structure of these parts with respect to the second cylinder 52, "first cylinder 51" and "outer peripheral surface 51b of the first cylinder 51" in the following description may be replaced with "second cylinder 52" and "outer peripheral surface 52b of the second cylindrical portion 52", respectively.

As shown in FIG. 7, the movable housing-seal part 53 is provided between the first cylinder 51 and the first movable housings 11. In this embodiment, the movable housing-seal part 53 is provided between the outer peripheral surface 51b of the first cylinder 51, and the inner surface 35a of the insertion part 35 of the partition 30. The movable housing-seal part 53 rotatably supports the first cylinder 51 with respect to the partition 30. In addition, the movable housing-seal part 53 liquid-tightly seals between the outer peripheral surface 51b of the first cylinder 51, and the inner surface 35a of the insertion part 35 of the partition 30. More specifically, the movable housing-seal part 53 includes a supporter 80, a first packing 81, and a second packing 82.

As shown in FIG. 6, the supporter 80 has a U-shaped outer form corresponding to the insertion part 35 of the partition 30. That is, the supporter 80 has a circular arc surface 84, a first side surface 85, a second side surface 86, and an end surface 87. The circular arc surface 84 of the supporter 80 faces the circular arc part 40 of the insertion part 35. The circular arc surface 84 of the supporter 80 has the same curvature as the circular arc part 40 of the insertion part 35. The first side surface 85 of the supporter 80 faces the first straight part 41 of the insertion part 35. The first side surface 85 of the supporter 80 extends substantially parallel to the first straight part 41 of the insertion part 35. The second side surface 86 of the supporter 80 faces the second straight part 42 of the insertion part 35. The second side surface 86 of the supporter 80 extends substantially parallel to the second straight part 42 of the insertion part 35. The end surface 87 is located in an end opposite to the circular arc surface 84 in the supporter 80. The end surface 87 is a plane surface, for example.

A guide 88 to be inserted into the guide slot 43 of the first straight part 41 or the second straight part 42 is formed in each of the first side surface 85 and the second side surface 86 of the supporter 80. The supporter 80 is stably attached to the insertion part 35 by the guides 88 being inserted in the guide slots 43.

A groove 89 is provided in the circular arc surface 84, the first side surface 85, the second side surface 86, and the end surface 87 of the supporter 80. The groove 89 is formed in a continuous annular shape over the circular arc surface 84, the first side surface 85, the second side surface 86, and the end surface 87.

The first packing 81 is attached to the groove 89 of the supporter 80. That is, the first packing 81 is provided between the inner surface 35a of the insertion part 35, and the supporter 80. The first packing 81 is formed in a ring shape along the circular arc surface 84, the first side surface 85, the second side surface 86, and the end surface 87 of the supporter 80. The first packing 81 is sandwiched between the circular arc surface 84, the first side surface 85 and the second side surface 86 of the supporter 80, and the circular arc part 40, the first straight part 41 and the second straight part 42 of the insertion part 35. The first packing 81 liquid-tightly seals between the inner surface 35a of the insertion part 35, and the supporter 80.

Further, as shown in FIG. 7, the supporter 80 has a hole 91 through which the first cylinder 51 passes. The hole 91 is formed in a round shape corresponding to an outer diameter of the first cylinder 51. The hole 91 has an inner diameter that is slightly larger than the outer peripheral surface 51b of the first cylinder 51. Inserting the first cylinder 51 into the hole 91 causes the supporter 80 to face the outer peripheral surface 51b of the first cylinder 51.

As mentioned above, the outer peripheral surface 51b of the first cylinder 51 includes the groove 68. The groove 68 faces an inner peripheral surface 91a of the hole 91 of the supporter 80. The second packing 82 is attached to the groove 68 of the first cylinder 51. The second packing 82 is, for example, an O ring. That is, the second packing 82 is formed in a ring shape. The cross-sectional shape of each part of the second packing 82, which is cut in a direction along the central axis of the second packing 82 (that is, a direction along the X direction) is circular. The second packing 82 is sandwiched between the outer peripheral surface 51b of the first cylinder 51, and the inner peripheral surface 91a of the hole 91 of the supporter 80. The second packing 82 liquid-tightly seals between the outer peripheral surface 51b of the first cylinder 51, and the inner peripheral surface 91a of the hole 91 of the supporter 80. In addition, the supporter 80 is rotatable with respect to the first cylinder 51 with the second packing 82 therebetween.

Next, the attachment 55 will be described.

As shown in FIG. 6, the attachment 55 is a member to attach (fix) the first hinge 14 to the first movable housing 11. The attachment 55 is provided in the side opposite to the fixed portion 50 with respect to the supporter 80. The attachment 55 is provided in the second region A2 of the first movable housing 11 (refer to FIG. 4). The attachment 55 includes a ring portion 95 attached to the first cylinder 51, and a plane portion 96 fixed to the first movable housing 11.

The ring portion 95 is formed in a ring shape surrounding the outer peripheral surface 51b of the first cylinder 51. The inner diameter of the ring portion 95 is slightly larger than the outer diameter of the first cylinder 51. The ring portion 95 is attached to the first cylinder 51 so that the ring portion 95 is rotatable.

As shown in FIG. 4, the plane portion 96 faces the bottom wall 26 of the first movable housing 11 in the second region A2. The bottom wall 26 has a plurality of bosses 97 at positions corresponding to the plane portion 96. A screw hole 97a is provided in the boss 97. The plane portion 96 has insertion holes 96a which communicate with the screw holes 97a. The plane portion 96 is fixed to the first movable housing 11 by fastening members 98 engaging with the insertion holes 96a, the fastening members 98 being inserted into the insertion holes 96a. For example, the fastening member 98 is a general-purpose fastening member such as a screw or a bolt. That is, the hinge 14 is fixed to the first movable housing 11 by the fastening members 98 that are general-purpose products. The first hinge 14 can be removed from the first movable housing 11 in a case where the fastening members 98 are removed.

Next, the washers 54 and the brake parts 56 will be described.

The washers 54 and the brake parts 56 are attached to the outer peripheral surface 51b of the first cylinder 51. The washer 54 is provided between the ring portion 95 of the attachment 55, and the supporter 80. The brake part 56 is located in the side opposite to the washer 54 with respect to the ring portion 95 of the attachment 55. For example, the brake part 56 includes another washer and a ring-shaped disk spring. The brake part 56 gives brake force to the first hinge 14. Thereby, the first movable housing 11 is held in a state where the first movable housing 11 is opened with respect to the main housing 13.

Next, the cable-seal part 57 will be described.

As shown in FIG. 7, the cable-seal part 57 is provided in a tip portion of the first cylinder 51. That is, the cable-seal part 57 is located in the side opposite to the fixed portion 50 with respect to the attachment 55 and the supporter 80. The cable-seal part 57 is provided in the second region A2 of the first movable housing 11.

At least a part of the cable-seal part 57 is provided between an inner peripheral surface 51a of the first cylinder 51, an outer peripheral surface 23b of the cable 23. The cable-seal part 57 liquid-tightly seals between the inner peripheral surface 51a of the first cylinder 51, the outer peripheral surface 23b of the cable 23. For example, the cable-seal part 57 is a cable ground for waterproofing. More specifically, the cable-seal part 57 includes a main part 101, a packing 102, a cap 103, and a bush 104.

The main part 101 is cylindrical. The main part 101 is a product made of plastic, for example. The main part 101 is elastically deformable. The main part 101 is attached to the tip portion of the first cylinder 51. For example, the main part 101 is attached to the inner peripheral surface 51a of the first cylinder 51. For example, the main part 101 is engaged with a female screw provided in the inner peripheral surface 51a of the first cylinder 51. The cable 23 passes through the inside of the main part 101. An outer peripheral surface of a tip portion of the main part 101 includes a screw part 106. In addition, the main part 101 includes a flange part 107 which receives the bush 104 from the side opposite to the cap 103.

The packing 102 liquid-tightly seals between the cylinder-end surface 51e of the first cylinder 51, and the main part 101. For example, the packing 102 is an O ring.

The cap 103 is attached to the tip portion of the main part 101. The cap 103 is engaged with the screw part 106 of the main part 101.

The bush 104 is sandwiched between the cap 103 and the flange part 107 of the main part 101. The bush 104 is au elastic member such as a rubber. If the cap 103 is rotated in a direction in which the cap 103 is fastened with respect to the main part 101, the bush 104 is sandwiched between the cap 103 and the flange part 107. In this state, if the cap 103 is further fastened with respect to the main part 101, the bush 104 is compressed and deformed (for example, crushed). If the bush 104 is deformed, the main part 101 pushed by the bush 104 is deformed so that the inner diameter of the main part 101 becomes smaller. Thereby, an inner peripheral surface 101a of the main part 101 is pressed to the outer peripheral surface 23b of the cable 23. Thereby a liquid-tight seal is provided between the outer peripheral surface 23b of the cable 23, and the inner peripheral surfaces 101a of the main part 101, and the position of the cable 23 with respect to the main part 101 is fixed.

As shown in FIG. 3 and FIG. 8, a lid member 111 is attached to the partition 30 of the first movable housing 11 from the side opposite to the bottom wall 26. The lid member 111 covers a space between the side wall part 28, the first wall 31, the second wall 32, and the third wall 33. The lid member 111 liquid-tightly seals between the side wall part 28, the first wall 31, the second wall 32, the third wall 33, and the lid member 111.

The lid member 111 is also in contact with the first packing 81 of the supporter 80. The first packing 81 includes a portion 81a which extends along the end surface 87 of the supporter 80. The portion 81a extends in the shape of a straight line. The lid member 111 is in contact with the portion 81a of the first packing 81, which extends in the shape of the straight line. Thereby, a firmly liquid-tight seal is provided between the supporter 80 and the lid member 111.

Next, a manufacturing method of the electronic apparatus 1 will be described. Here, assembling the joint part of the first movable housing 11 and the main housing 13 will be mainly described. Regarding assembling the joint part of the second movable housing 12 and the main housing 13, "first movable housing 11", "first hinge 14", and "cable 23" in the following description may be replaced with "second movable housing 12", "second hinge 15", and "cable 24", respectively.

First, the first movable housing 11, the main housing 13, the first hinge 14, and the cable 23 are prepared. In this stage, the cover 22 of the first movable housing 11 is not attached to the base 21 of the first movable housing 11. The cover 22 of the main housing 13 is not attached to the base 21 of the main housing 13.

In this embodiment, the supporter 80 and the second packing 82 of the movable housing-seal part 53 are attached to each of the first cylinder 51 and the second cylinder 52 of the first hinge 14 before the first hinge 14 is connected to the first movable housing 11. In this embodiment, the first packing 81 of the movable housing-seal part 53 is also attached to the supporter 80 of the movable housing-seal part 53 before the first hinge 14 is connected to the first movable housing 11.

In this embodiment, the main part 101 of the cable-seal part 57 is attached to each of the first cylinder 51 and the second cylinder 52 of the first hinge 14 before the first hinge 14 is connected to the first movable housing 11. Furthermore, the cap 103 of the cable-seal part 57 is attached to the main part 101 of the cable-seal part 57 before the first hinge 14 is connected to the first movable housing 11.

Next, the cable 23 is inserted into the inside of the first hinge 14. That is, the cable 23 is inserted into the inside of the connection portion 59 and the fixed portion 50 of the first hinge 14. In this embodiment, the cable 23 is also inserted into the main part 101 and the cap 103 of the cable-seal part 57 which has been already attached to the first hinge 14. For example, the cable 23 is inserted into the main part 101 and the cap 103 of the cable-seal part 57 before the cable 23 is inserted into the first hinge 14.

Next, the connection portion 59 of the first hinge 14 is connected to the first movable housing 11. Specifically, the connection portion 59 of the first hinge 14 is fixed to the first movable housing 11 by the attachments 55 and the fastening members 98. The connection portion 59 of the first hinge 14 is fixed to the first movable housing 11 in the state where the movable housing-seal part 53 is sandwiched between the connection portion 59 and the first movable housings 11. For example, the connection portion 59 of the first hinge 14 is fixed to the first movable housing 11 in the state where the movable housing-seal parts 53 are sandwiched between the outer peripheral surfaces 51b and 52b of the first cylinder 51 and the second cylinder 52, and the inner surfaces 35a of the insertion parts 35.

More specifically, in this embodiment, the first cylinder 51 and the second cylinder 52 of the first hinge 14 are inserted into the insertion parts 35 of the first movable housing 11 in the thickness direction (the Z direction) of the first movable housing 11. The supporter 80, the first packing 81, and the second packing 82 of the movable housing-seal part 53 are disposed inside the insertion part 35 by the action that the first cylinder 51 and the second cylinder 52 are inserted into the insertion parts 35. Thereby, the liquid-tight seals are provided between the outer peripheral surfaces 51b and 52b of the first cylinder 51 and the second cylinder 52, and the inner surfaces 35a of the insertion parts 35.

The cap 103 is rotated along the screw part 106 of the outer peripheral surface of the main part 101 (that is, fastened to the main part 101), after the cable 23 is inserted into the connection portion 59 of the first hinge 14 and the main part 101 of the cable-seal part 57. Thereby, the cap 103 squashes the bush 104 between the main part 101 and the cap 103, and the bush 104 makes the diameter of the main part 101 smaller. Thereby, a liquid-tight seal is provided between the inner peripheral surfaces 51a of the first cylinder 51, and the outer peripheral surface 23b of the cable 23, and the position of the cable 23 with respect to the connection portion 59 and the main part 101 is fixed.

Next, the fixed portion 50 of the first hinge 14 is connected to the main housing 13. Specifically, the fixed portion 50 of the first hinge 14 is fixed to the main housing 13 by the fastening members 67. The fixed portion 50 of the first hinge 14 is fixed to the main housing 13 in the state where the main housing-seal part 66 is sandwiched between the fixed portion 50 and main housing 13. Thereby, a liquid-tight seal is provided between the fixed portion 50 of the first hinge 14, and the main housings 13.

Next, the lid member 111 is attached to the partition 30. The cover 22 of the first movable housing 11 is attached to the base 21 of the first movable housing 11. Similarly, the cover 22 of the main housing 13 is attached to the base 21 of the main housing 13. Thereby, the electronic apparatus 1 is assembled.

The fixation of the connection portion 59 of the first hinge 14 with respect to the first movable housing 11 may be performed before or after the cable 23 is inserted into the connection portion 59 and the fixed portion 50 of the first hinge 14. Similarly, the fixation of the fixed portion 50 of the first hinge 14 with respect to the main housing 13 may be performed before or after the cable 23 is inserted into the connection portion 59 and the fixed portion 50 of the first hinge 14. The fixation of the fixed portion 50 of the first hinge 14 with respect to the main housing 13 may be performed before or after the connection portion 59 of the first hinge 14 is attached to the first movable housing 11.

The main part 101 of the cable-seal part 57 may be attached to the first hinge 14 after the cable 23 is inserted into the inside of the first hinge 14. Similarly, the cap 103 of the cable-seal part 57 may be attached to the main part 101 after the cable 23 is inserted into the inside of the first hinge 14 (further, after the cable 23 is inserted into the main part 101, for example). However, in these cases, it may be desirable that the cable 23 is inserted into the main part 101 and the cap 103 of the cable-seal part 57 before the cable is inserted into the first hinge 14.

According to the above configuration, the electronic apparatus 1 which improves waterproofness with a relatively simple structure can be provided.

That is, the electronic apparatus 1 of this embodiment includes the first movable housing 11, the main housing 13, the first hinge 14 (joint), the cable 23A, and the seal structure 19. The first movable housing 11 has the insertion part 35 (a first opening) of the second wall 32. The first movable housing 11 accommodates at least a first antenna element 16aa. The main housing 13 has the opening 65 (a second opening). The first hinge 14 includes the connection portion 59 and the fixed portion 50. The connection portion 59 is connected to the first movable housing 11. The connection portion 59 communicates with the inside of the first movable housing 11 through the insertion part 35 of the second wall 32. The fixed portion 50 is connected to the main housing 13. The fixed portion 50 communicates with the inside of the main housing 13 through the opening 65. The first hinge 14 rotatably connects the first movable housing 11 and the main housing 13. The cable 23A is electrically connected to the first antenna element 16aa. The cable 23A extends from the inside of the movable housing 11 to the inside of the main housing 13 through the inside of the connection portion 59 and the inside of the fixed portion 50. The seal structure 19 seals between the movable housing 11 and the connection portion 59, and seals between the main housing 13 and the fixed portion 50.

According to such configuration, it is possible to decrease the number of openings provided in the housings 11 and 13 since the cable 23 A extends inside the housings 11 and 13 through the inside of the first hinge 14. Thereby, it is possible to improve the waterproofness of the electronic apparatus 1.

Further, according to such configuration, the seal structure 19 seals between the first movable housing 11 and the connection portion 59 of the first hinge 14. Thereby, it is possible to suppress water, moisture, dust, or the like from entering the inside of the first movable housing 11 or the inside of the first hinge 14 from a gap between the first movable housing 11 and the first hinge 14. In addition, the seal structure 19 seals between the main housing 13 and the fixed portion 50 of the first hinge 14. Thereby, it is possible to limit water, moisture, dust, or the like from entering the inside of the main housing 13 or the inside of the first hinge 14 from a gap between the main housing 13 and the first hinge 14. Thereby, the waterproofness and reliability of the electronic apparatus 1 is further enhanced.

Further, according to such configuration, the cable 23 is not substantially exposed to the outside of the electronic apparatus 1. Thereby, it is possible to provide the electronic apparatus 1 which is good in designability and easy to use.

For example, according to the configuration of this embodiment, it is possible to provide a waterproofing structure which is easy to apply to a large-sized housing of small-volume production while it is possible to allow the cable 23 having a large diameter to pass the waterproofing structure.

Further, according to such configuration, it is possible to provide the electronic apparatus 1 in which three or more housings are rotatably connected while the electronic apparatus realizes waterproofness. For example, another housing is added in the side opposite to the first movable housing 11 and the second movable housing 12 with respect to the main housing 13 since a hinge that is similar to the hinges 14 and 15 is provided.

In this embodiment, the connection portion 59 includes the first cylinder 51 inserted in the insertion part 35 of the second wall 32. The cable 23A passes through the inside of the first cylinder 51.

According to such configuration, the first cylinder 51 can enhances the stability of rotation of the first movable housing 11. Furthermore, it is possible to stably guide the cable 23 from the inside of the first movable housing 11 to the inside of the main housing 13 by using the shape of the first cylinder 51.

In this embodiment, the seal structure 19 includes the movable housing-seal part 53. The movable housing-seal part 53 is provided between the inner surface 35a of the insertion part 35 of the second wall 32, and the outer peripheral surface 51b of the first cylinder 51.

According to such configuration, a liquid-tight seal can be provided between the inner surface 35a of the insertion part 35, and the outer peripheral surface 51b of the first cylinder 51. Thereby, it is possible to further improve waterproofness around the first cylinder 51 inserted in the insertion part 35.

In this embodiment, the movable housing-seal part 53 includes the supporter 80, the first packing 81, and the second packing 82. The supporter 80 is attached to the insertion part 35 and has the hole 91 through which the first cylinder 51 passes. The first packing 81 seals between the inner surface 35a of the insertion part 35, and the supporter 80. The second packing 82 seals between the inner peripheral surface 91a of the hole 91 of the supporter 80, and the outer peripheral surface 51b of the first cylinder 51.

According to such configuration, the plurality of packings 81 and 82 securely seals between the inner surface 35a of the insertion part 35, and the outer peripheral surface 51b of the first cylinder 51. Thereby, even when the shape of the insertion part 35 differs from the shape of the first cylinder 51, a seal between the inner surface 35a of the insertion part 35, and the outer peripheral surface 51b of the first cylinder 51 is securely provided. In other words, according to the above-mentioned configuration, it is possible that the shapes of the insertion part 35 and the first cylinder 51 are different each other. If the shapes of the insertion part 35 and the first cylinder 51 can be different each other, the design flexibility will increase, and the ease of attaching and removing of the first hinge 14 with respect to the first movable housing 11 is enhanced.

In this embodiment, the supporter 80 can be rotated with respect to the first cylinder 51 with the second packing 82 therebetween. Here, according to the above-mentioned movable housing-seal part 53 including the supporter 80, the first packing 81, and the second packing 82, it is possible to use a ring packing along the outer peripheral surface 51b of the first cylinder 51 as the second packing 82. Thereby, it is possible to securely seal the sliding portions between the supporter 80 and the first cylinder 51 with the second packing 82. Thereby, it is possible to further improve the waterproofness of the electronic apparatus 1.

Here, there is no permeation of water inside the first hinge 14 fundamentally. However, a possibility that water or moisture will go into the inside of the first hinge 14 according to aged deterioration due to long-term use of the electronic apparatus 1, the environment (for example, environment where condensation easily occurs) of the electronic apparatus 1 or the like is not zero.

In this embodiment, the seal structure 19 includes the cable-seal part 57. The cable-seal part 57 seals between the inner peripheral surface 51a of the first cylinder 51, and the outer peripheral surface 23b of the cable 23A.

According to such configuration, it is possible to liquid-tightly seal between the inner peripheral surface 51a of the first cylinder 51, and the outer peripheral surface 23h of the cable 23. Thereby, it is possible to suppress water or moisture from entering the inside of the movable housing 11 by the water or density going along the outer peripheral surface 23b of the cable 23 from the inside of the first hinge 14, for example. Thereby, it is possible to provide a higher moister protection or the like to the antenna element 16a (or the antenna board 16). In other words, the antenna element 16a (or the antenna board 16) is susceptible to the influence of rain or the like because it is arranged to face upward. The antenna performance of the antenna element 16a (or the antenna board 16) is likely to be affected by the antenna element 16a (or the antenna board 16) contacting with water or moisture. Such the antenna element 16a (or the antenna board 16) is protected more securely by the cable-seal part 57. Thereby, the reliability of the electronic device 1 can be further improved.

In this embodiment, the first movable housing 11 includes the hole 29 and the partition 30. The hole 29 opens to the outside of the first movable housing 11. The partition 30 divides the inside of the first movable housing 11 into the first region A1 that communicates with the hole 29, and the second region A2 in which the first antenna element 16aa is disposed. The insertion part 35 is provided in the partition 30.

According to such configuration, the inside of the first movable housing 11 is divided, by the partition 30, into the first region A1 where water is allowed to enter, and the second region A2 which has waterproofness. Thereby, compared with a case where a waterproofing structure is provided in the boundary between the first movable housing 11 and the main housing 13, the design flexibility of the shape and the position of the waterproofing structure become large. Thereby, it is possible to simplify the waterproofing structure.

In this embodiment, the connection portion 59 of the first hinge 14 is inserted into the insertion part 35 of the partition 30 so that the connection portion 59 is provided over the first region A1 and the second region A2 of the first movable housing 11. The fixed portion 50 of the first hinge 14 includes a part disposed in the first region A1 of the first movable housing 11. The fixed portion 50 protrudes the outside of the first movable housing 11 through the hole 29.

According to such configuration, a part of the first hinge 14 is accommodated in the inside of the first movable housing 11. As a result, it is possible to miniaturize the electronic apparatus 1.

In this embodiment, the electronic apparatus 1 includes a second antenna element 16bb accommodated in the first movable housing 11, and the cable 23B electrically connected to second antenna element 16bb. The third wall 33 of the partition 30 of the first movable housing 11 has the insertion part 35 (third opening). The connection portion 59 of the first hinge 14 includes the second cylinder 52 inserted in the insertion part 35 of the third wall 33. The cable 23B extends from the inside of the first movable housing 11 to the inside of the main housing 13 through the inside of the second cylinder 52 and the inside of the fixed portion 50. The cable 23B electrically connects the second antenna element 16bb and the control board 18.

According to such configuration, the plurality of cables 23A and 23B can extend over the first movable housing 11 and the main housing 13 through the first hinge 14, and it is possible to improve the waterproofness around the first hinge 14.

In this embodiment, the first hinge 14 includes the attachment 55 that attaches the first cylinder 51 to the first movable housing 11. The attachment 55 is detachably attached to the first movable housing 11 by the fastening members 98.

According to such configuration, the first hinge 14 is easily removed from the first movable housing 11 by removing the fastening members 98. In other words, it is possible to only one or two housings desired to be removed among the first movable housing 11, the second movable housing 12, and the main housing 13 can be removed from the other housings. For example, in a case where a failure is occurs in one housing, only the housing can be removed and maintenance or repair can be performed. For this reason, the housing structure 2 that is excellent in workability of the maintenance or the repair.

In this embodiment, the attachment 55 is provided in the second region A2 of the first movable housing 11. According to such configuration, it is possible to make the area of the first region A1 small, and to make the area of the second region A2 comparatively large inside the first movable housing 11. Thereby, the degree of freedom of component-layout in the first movable housing 11 can be increased.

In this embodiment, an example of the electronic apparatus 1 is antenna device. According to such configuration, an Antenna device which is foldable and is good in waterproofness can be provided.

In an example of a manufacturing method of the electronic apparatus 1 of this embodiment, the cable 23 is inserted into the inside of the connection portion 59 and the fixed portion 50 of the first hinge 14. The connection portion 59 of the first hinge 14 is fixed to the first movable housing 11 in the state where the movable housing-seal part 53 is located between the first movable housing 11 and the connection portion 59 before or after the cable 23 is inserted into the inside of the connection portion 59 and the fixed portion 50 of the first hinge 14. The fixed portion 50 of the first hinge 14 is fixed to the main housing 13 in the state where the main housing-seal part 66 is located between the main housing 13 and the fixed portion 50 before or after the cable 23 is inserted into the inside of the connection portion 59 and the fixed portion 50 of the first hinge 14.

According to such configuration, it is possible to assemble the electronic apparatus 1 that improve the waterproofness by having the movable housing-seal part 53 and the main housing-seal part 66.

In this embodiment, the connection portion 59 of the first hinge 14 is fixed to the first movable housing 11 after the cable 23 is inserted into the connection portion 59 and the fixed portion 50 of the first hinge 14.

According to such configuration, in the insertion operation of the cable 23 with respect to the first hinge 14, the first movable housing 11 is not like to be obstacle. Thereby, the ease of assembly of the electronic device 1 can be enhanced.

In this embodiment, the fixed portion 50 of the first hinge 14 is fixed to the main housing 13 after the cable 23 is inserted into the inside of the connection portion 59 and the inside of the fixed portion 50 of the first hinge 14.

According to such configuration, in the insertion operation of the cable 23 with respect to the first hinge 14, the main housing 13 is not like to be obstacle. Thereby, the ease of assembly of the electronic device 1 can be enhanced.

In this embodiment, the connection portion 59 of the first hinge 14 is fixed to the first movable housing 11 in the state where the movable housing-seal part 53 is located between the inner surface 35a of the insertion part 35, and the outer peripheral surface 51b of the first cylinder 51.

According to such configuration, it is possible to seals in a liquid-tight manner with high accuracy between the inner surface 35a of the insertion part 35, and the outer peripheral surface 51b of the first cylinder 51.

In this embodiment, the supporter 80 and the second packing 82 of the movable housing-seal part 53 are attached to the first cylinder 51 of the first hinge 14 before the connection portion 59 of the first hinge 14 is connected to the first movable housing 11, and the supporter 80 and the second packing 82 of the movable housing-seal part 53 are disposed inside the insertion part 35 with the action that the first cylinder 51 is inserted into the insertion part 35.

According to such configuration, the supporter 80 and the second packing 82 of the movable housing-seal part 53 is easily attached to the inside of the insertion part 35. Thereby, the ease of assembly of the electronic device 1 can be enhanced.

In this embodiment, the cable-seal part 57 seals the inner peripheral surface 51a of the first cylinder 51, and the outer peripheral surface 23b of the cable 23 after the cable 23 is inserted into the inside of the connection portion 59 and the inside of the fixed portion 50 of the first hinge 14.

According to such configuration, the cable-seal part 57 seals the inner peripheral surface 51a of the first cylinder 51, and the outer peripheral surface 23b of the cable 23 after the position of the cable 23 is roughly fixed. Thereby, the cable-seal part 57 liquid-tightly seals more securely between the inner peripheral surface 51a of the first cylinder 51, and the outer peripheral surface 23h of the cable 23.

In this embodiment, the cap 103 of the cable-seal part 57 fixes the position of the cable 23 with respect to the connection portion 59 of the first hinge 14 by the cap 103 being fastened to the main part 101 after the cable 23 is inserted into the inside of the connection portion 59 of the first hinge 14 and the inside of the main part 101.

According to such configuration, it is possible to fix the position of the cable 23 with respect to the connection portion 59 of the first hinge 14 after the position of the cable 23 is roughly fixed. Thereby, the necessity of caring about a margin of the length of the cable 23, bending of the cable 23 and the like at the time when the electronic apparatus 1 is assembled decreases. Thereby, the ease of assembly of the electronic device 1 can be enhanced.

In this embodiment, the cap 103 fixes the position of the cable 23 by the cap 103 being fastened to the main part 101 to squash the bush 104 between the main part 101 and the cap 103 and to make the diameter of the main part 101 smaller by the bush 104.

According to such configuration, the position of the cable 23 can be more reliably fixed. In addition, the fixation of the position of the cable 23 and the sealing between the inner peripheral surface 51a of the first cylinder 51 and the outer peripheral surface 23b of the cable 23 are simultaneously achieved. Thereby, the ease of assembly of the electronic device 1 can be enhanced.

Next, one modification will be described.

Figure 9:
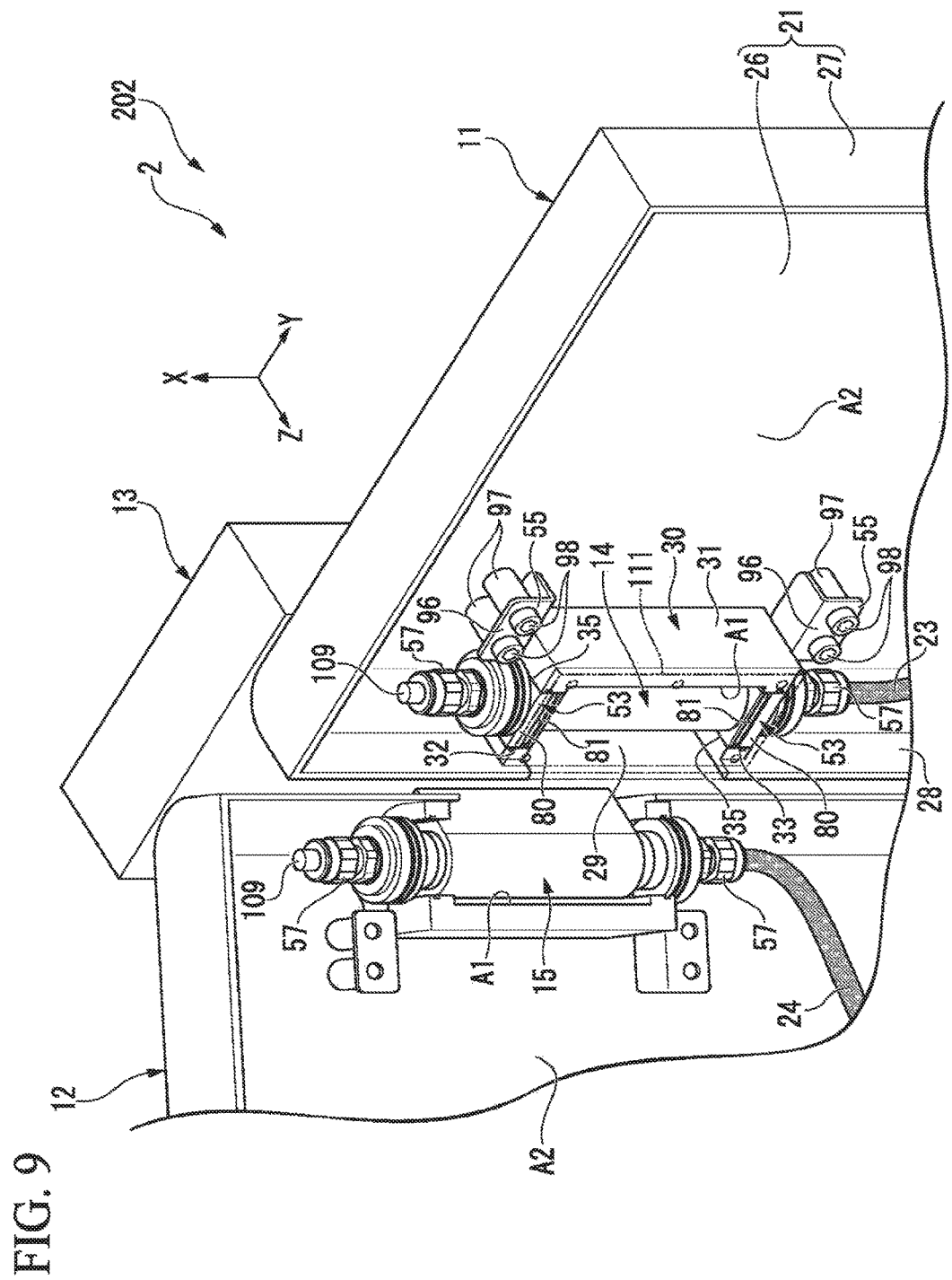
FIG. 9 is a perspective view showing the inside of an antenna unit of a modification.

FIG. 9 shows a antenna unit 202 of one modification of the embodiment.

As shown in FIG. 9, at a spot which does not need a cable, a closing member 109 is inserted into the main part 101 of the cable-seal part 57 instead of the cable 23 or 24. If the cap 103 is fastened like the above-mentioned manner in a state where the closing member 109 is inserted, it is possible to seal the tip portion of the main part 101. According to such configuration, the same waterproofness as that of the above-mentioned embodiment is provided.

Embodiments of the housing structure 2 and the electronic apparatus 1 are not limited to the above-mentioned example. For example, the hinges 14 and 15 includes the fixed portions 50 connected to the antenna housings 11 and 12, and the connection portions 59 connected to the main housing 13 instead of the above-mentioned configuration. In this case, the main housing 13 includes the holes 29 and the partition 30. The first movable housing 11 and the second movable housing 12 have the openings 65.

Further, the electric apparatus 1 does not need to include a plurality of movable housings. The electric apparatus may have only a movable housing. Further, the connection structure in the above-mentioned embodiment may be applied, for example, to the joint of the second supporter 212 and the third supporter 213 of the electronic apparatus 1. In this case, "movable housing" and "main housing" may be called "first member" and "second member." The electronic apparatus 1 is not limited to an antenna device. The electronic apparatus 1 and the housing structure 2 of this embodiment are broadly applicable to various electronic apparatuses. In this case, the electronic component accommodated in a movable housing and a main housing is not limited to an antenna element.

According to at least one embodiment described above, an electronic apparatus includes a movable housing, main housing, a joint, a cable, and seal structure. The movable housing has a first opening and accommodates at least an antenna element. The main housing has a second opening. The joint includes a connection portion and a fixed portion. The connection portion is connected to the movable housing. The connection portion communicates with an inside of the movable housing through the first opening. The fixed portion is connected to the main housing. The fixed portion communicates with an inside of the main housing through the second opening. The joint rotatably connects the movable housing and the main housing. The cable is electrically connected to the antenna element. The cable extends from the inside of the movable housing to the inside of the main housing through an inside of the connection portion and an inside of the fixed portion. The seal structure seals between the movable housing and the connection portion, and seals between the main housing and the fixed portion. According to such configuration, waterproofness of the electronic apparatus can be improved.

While certain embodiments of the invention have been described, these embodiments have been presented by way of example only, and are not intended to limit the scope of the inventions. Indeed, these embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF REFERENCE NUMERALS

1 . . . an electronic apparatus, 11 . . . a first movable housing, 13 . . . a main housing, 14 . . . a first hinge (joint), 16aa . . . a first antenna element, 16ab . . . a second antenna element, 18 . . . a control board (circuit board), 19 . . . a seal structure, 23 . . . a cable, 23A . . . a first cable, 23B . . . a second cable, 29 . . . a hole, 30 . . . a partition, 35 . . . an insertion part (opening), 50 . . . a fixed portion, 51 . . . a first cylinder, 52 . . . a second cylinder, 53 . . . a movable housing-seal part, 57 . . . a cable-seal part, 59 . . . a connection portion, 65 . . . an opening, 66 . . . a main housing-seal part, 80 . . . a supporter, 81 . . . a first packing, 82 . . . a second packing, hole . . . 91, 101 . . . a main part of a cable seal-part, 103 . . . a cap, 104 . . . a bush, A1 . . . a first region, A2 . . . a second region.

The invention claimed is:

1. An electronic apparatus comprising:
a movable housing having a first opening, the movable housing accommodating at least a first antenna element;
a main housing having a second opening;
a joint rotatably connecting the movable housing and the main housing, the joint comprising a connection portion and a fixed portion, the connection portion being connected to the movable housing, the connection portion communicating with an inside of the movable housing through the first opening, the connection portion comprising a first cylinder inserted in the first opening, the fixed portion being connected to the main housing, and the fixed portion communicating with an inside of the main housing through the second opening;
a first cable electrically connected to the first antenna element, the first cable extending from the inside of the movable housing to the inside of the main housing through an inside of the first cylinder of the connection portion and an inside of the fixed portion; and
a seal structure sealing between the movable housing and the connection portion, and sealing between the main housing and the fixed portion, the seal structure comprising a movable housing-seal part between an inner surface of the first opening and an outer peripheral surface of the first cylinder, the movable housing-seal part comprising a supporter, a first packing, and a second packing, the supporter being attached to the first opening, the supporter having a hole through which the first cylinder passes, the first packing sealing between the inner surface of the first opening and the supporter, and the second packing sealing between an inner peripheral surface of the hole of the supporter and the outer peripheral surface of the first cylinder.

2. The electronic apparatus according to claim 1, wherein the supporter is rotatable with respect to the first cylinder with the second packing therebetween.

3. The electronic apparatus according to claim 1, wherein the seal structure comprises a cable-seal part, and the cable-seal part seals between an inner peripheral surface of the first cylinder and an outer peripheral surface of the first cable.

4. An electronic apparatus comprising:
a movable housing accommodating at least a first antenna element, the movable housing including a hole, a partition, and a first opening, the hole opening to an outside of the movable housing, the partition dividing an inside of the movable housing into a first region and a second region, the first region communicating with the hole, the first antenna element being disposed in the second region, and the first opening being provided in the partition;
a main housing having a second opening;
a joint rotatably connecting the movable housing and the main housing, the joint comprising a connection portion and a fixed portion, the connection portion being connected to the movable housing, the connection portion communicating with the inside of the movable housing through the first opening, the fixed portion being connected to the main housing, and the fixed portion communicating with an inside of the main housing through the second opening;
a first cable electrically connected to the first antenna element, the first cable extending from the inside of the movable housing to the inside of the main housing through an inside of the connection portion and an inside of the fixed portion; and
a seal structure sealing between the movable housing and the connection portion, and sealing between the main housing and the fixed portion.

5. The electronic apparatus according to claim 4, wherein the connection portion passes through the first opening and is provided over the first region and the second region of the movable housing, and
the fixed portion includes a part disposed in the first region of the movable housing, and the fixed portion protrudes to the outside of the movable housing through the hole.

6. The electronic apparatus according to claim 4, further comprising:
the second antenna element accommodated in the movable housing; and
the second cable electrically connected to the second antenna element,
wherein
the partition of the movable housing has a third opening,
the connection portion comprises a second cylinder, and the second cylinder is inserted in the third opening,
the second cable extends from the inside of the movable housing to the inside of the main housing through an inside of the second cylinder and the inside of the fixed portion.

7. A manufacturing method of an electronic apparatus comprising:
inserting a cable into an inside of a connection portion and an inside of a fixed portion, a joint comprising the connection portion and the fixed portion, the connection portion being to be connected to a movable hosing, the connection portion comprising a cylinder that is to be inserted into an opening of the movable housing, and the fixed portion being to be connected to the main housing,
fixing the connection portion to the movable housing in a state where a movable housing-seal part is located between an inner surface of the opening of the movable housing and an outer peripheral surface of the cylinder of the connection portion, the movable housing-seal part comprising a supporter, a first packing, and a second packing, the supporter being attached to the opening, the supporter having a hole through which the cylinder passes, the first packing sealing between the inner surface of the opening and the supporter, and the second packing sealing between an inner peripheral surface of the hole of the supporter and the outer peripheral surface of the cylinder, the supporter and the second packing being attached to the cylinder before the connection portion is connected to the movable housing, and the supporter and the second packing being disposed inside the opening by an action that the cylinder is inserted into the opening; and fixing the fixed portion to the main hosing in a state where a main housing-seal part is located between the main housing and the fixed portion.

8. The manufacturing method of the electronic apparatus according to claim 7, wherein the connection portion is fixed to the movable housing after the cable is inserted into the inside of the connection portion and the inside of the fixed portion.

9. The manufacturing method of the electronic apparatus according to claim 8, wherein the fixed portion is fixed to the main housing after the cable is inserted into the inside of the connection portion and the inside of the fixed portion.

10. The manufacturing method of the electronic apparatus according to claim 7, further comprising:

sealing between the inner peripheral surface of the cylinder and the outer peripheral surface of the cable by a cable-seal part after the cable is inserted into the inside of the connection portion and the inside of the fixed portion.

11. The manufacturing method of the electronic apparatus according to claim 10, wherein the cable-seal part comprises a main part and a cap, the main part is connected to the connection portion, the cable is inserted into the main part, and the cap is attached to the main part, and the cap fixes a position of the cable by the cap being fastened to the main part after the cable is inserted into the inside of the connection portion.

12. The manufacturing method of the electronic apparatus according to claim 11, wherein the cable-seal part comprises a bush sandwiched between the main part and the cap, and the cap fixes the position of the cable by the cap being fastened to the main part to squash the bush between the main part and the cap and to make a diameter of the main part smaller by the bush.

* * * * *